(12) United States Patent
Kume et al.

(10) Patent No.: US 7,239,147 B2
(45) Date of Patent: Jul. 3, 2007

(54) METHOD AND DEVICE FOR INSPECTING SECONDARY BATTERY PRECURSOR AND METHOD FOR MANUFACTURING SECONDARY BATTERY USING THE INSPECTION METHOD

(75) Inventors: Toshiro Kume, Osaka (JP); Masashi Shoji, Osaka (JP); Emiko Igaki, Amagasaki (JP); Shuji Tsutsumi, Ikoma (JP); Mikinari Shimada, Yawata (JP); Masakazu Tanahashi, Osaka (JP); Akira Takahashi, Kadoma (JP); Shouichi Imashuku, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 184 days.

(21) Appl. No.: 10/523,177

(22) PCT Filed: Aug. 14, 2003

(86) PCT No.: PCT/JP03/10361

§ 371 (c)(1),
(2), (4) Date: Jan. 28, 2005

(87) PCT Pub. No.: WO2004/021498

PCT Pub. Date: Mar. 11, 2004

(65) Prior Publication Data

US 2005/0242820 A1    Nov. 3, 2005

(30) Foreign Application Priority Data

Aug. 29, 2002 (JP) .............................. 2002-251928

(51) Int. Cl.
*H01M 10/48* (2006.01)
*G01R 31/36* (2006.01)

(52) U.S. Cl. ................. 324/430; 324/425; 324/522; 324/433

(58) Field of Classification Search ........... 324/425, 324/430

See application file for complete search history.

(56) References Cited

U.S. PATENT DOCUMENTS 5,420,513 A  *  5/1995  Kimura ................. 324/551

(Continued)

FOREIGN PATENT DOCUMENTS

| JP | 8-45538 | 2/1996 |
|---|---|---|
| JP | 2000-28690 | 1/2000 |
| JP | 2000-195565 | 7/2000 |
| JP | 2002-110217 | 4/2002 |
| JP | 2003157911 A * | 5/2003 |

OTHER PUBLICATIONS

"Revised New Edition of Discharge Handbook", The Institute of Electrical Engineers of Japan (1974): 134.

*Primary Examiner*—Andrew H. Hirshfeld
*Assistant Examiner*—John Zhu
(74) *Attorney, Agent, or Firm*—Hamre, Schumann, Mueller & Larson, P.C.

(57) ABSTRACT

A method for testing a precursor of a secondary cell with high reliability and high efficiency to judge the precursor to be acceptable or defective. The current flowing when a test voltage is applied between a pair of electrodes is measured before an electrolyte is placed between the electrodes. If a current the current value of which exceeds a predetermined reference current value (13) is detected during the time from the start of application of a voltage to a normal secondary cell precursor until the current becomes constant, the precursor is determined to be defective.

25 Claims, 10 Drawing Sheets

U.S. PATENT DOCUMENTS 5,563,508 A * 10/1996 Tatah ....................... 324/158.1
5,650,620 A * 7/1997 Janah et al. ................. 250/310
5,709,962 A * 1/1998 Bailey ......................... 429/93
5,780,994 A * 7/1998 Sisemore .................... 320/156
5,914,605 A * 6/1999 Bertness .................... 324/430
6,392,416 B1 * 5/2002 Keech ........................ 324/438

* cited by examiner

METHOD AND DEVICE FOR INSPECTING SECONDARY BATTERY PRECURSOR AND METHOD FOR MANUFACTURING SECONDARY BATTERY USING THE INSPECTION METHOD

TECHNICAL FIELD

The present invention relates to a method and a device for inspecting a secondary battery precursor, and further to a method for manufacturing a secondary battery. The present invention particularly relates to, for example, a non-destructive inspection for detecting a secondary battery precursor with insufficient insulation between electrodes from a plurality of manufactured secondary battery precursors.

BACKGROUND ART

In the secondary battery manufacturing process, it is required to detect products that are short-circuited between electrodes or products that may become short-circuited in the future. The detection is performed with respect to an electrode body including a positive electrode, a negative electrode, and a separator provided between the plates thereof, before an electrolyte solution is injected into a battery case. As a method of such detection, a method of measuring the insulation resistance of the electrode body when a voltage is applied between the positive and negative electrodes is disclosed (see JP 8(1996)-45538 A). Further, a method of determining whether a product is non-defective or defective by applying between the positive and negative electrodes a voltage that causes no dielectric breakdown in non-defective products but causes dielectric breakdown in potentially short-circuited products, more specifically a voltage of 100-400 V, is disclosed (see JP 2000-195565 A).

In the inspection method disclosed in JP 8(1996)-45538 A, it is impossible to determine whether insulation is sufficient or not unless the insulation resistance after a certain period of elapsed time is measured. This is because the electrode body has a low resistance due to the flow of an inrush current immediately after the application of the voltage. Further, in this method, since the insulation resistance is merely measured, it may be impossible to detect an electrode body that may become short-circuited in the future in which, although the positive electrode and the negative electrode are not in contact with each other, they are in close proximity to each other due to a defect of the separator or the like.

In the inspection method disclosed in JP-2000-195565 A, air discharge is used (see paragraph [0009], for example). In air discharge in an atmospheric pressure environment, when the distance between the electrodes is 25 μm or more, a discharging start voltage decreases with decreasing distance. However, when the discharge distance is shorter than 25 μm, a withstand voltage increases conversely, and discharge is not started until a higher voltage is achieved (e.g., see The Institute of Electrical Engineers of Japan, "Revised New Edition of Discharge Handbook", Ohmsha, Ltd., published on Feb. 15, 1974, page 134). On this account, in the case where a foreign object is present between the positive and negative electrodes, so that a substantial insulation distance between the plates is approximately 25 μm or less, it is difficult to detect potentially short-circuited products even though a short circuit is likely to occur after injection of an electrolyte solution.

In recent years, lithium ion secondary batteries use a separator with a thickness of 25 μm or less. The application of the inspection method disclosed in JP-2000-195565 A itself to such secondary batteries is not suitable.

DISCLOSURE OF INVENTION

In view of such a situation, an object of the present invention is to provide a new inspection method for inspecting a secondary battery precursor (plate group), a method for manufacturing a secondary battery using the same, and an inspection device used for the inspection.

A method for inspecting a secondary battery precursor of the present invention is a method for inspecting a secondary battery precursor including a pair of electrodes and a separator disposed between the pair of electrodes, including: applying a constant inspection voltage between the pair of electrodes before an electrolyte solution is injected between the pair of electrodes, and measuring a current flowing due to application of the inspection voltage; and determining the precursor to be defective if a current value exceeding a previously set reference current value is detected within a time period corresponding to a time period between starting of voltage application when a voltage is applied to a normal secondary battery precursor and obtaining of a constant current. According to this inspection method, the inspection can be completed before a constant current is obtained. Therefore, a short-circuited product or a potentially short-circuited product can be detected in a short time.

By setting the reference current value based on a current when a voltage is applied to a normal secondary battery precursor, an accurate inspection can be performed. Further, a plurality of reference current values may be set depending upon time. In this case, the reference current values may be set at intervals of 1 ms or less.

In the description, the normal secondary battery precursor is, for example, a battery having no problem in initial battery characteristics and characteristics after 50 or more cycles of charge and discharge. Further, the reference current value is obtained as a result of averaging 100 charging current waveforms obtained by measuring 100 normal secondary battery precursors.

According to another inspection method of the present invention, a defective product is determined based on the change of a current over time (charging current waveform) when a voltage is applied to a normal secondary battery precursor. This inspection method is a method for inspecting a secondary battery precursor including a pair of electrodes and a separator disposed between the pair of electrodes, including: applying an inspection voltage between the pair of electrodes before an electrolyte solution is injected between the pair of electrodes, and measuring a current flowing due to application of the inspection voltage; and determining the precursor to be defective if the current has a value beyond a predetermined allowable range calculated based on a current waveform when a voltage is applied to a normal secondary battery precursor. According to this inspection method, a current supplied to charge a precursor to be measured is measured with reference to the change of a current over time when a non-defective product (normal secondary battery precursor) is charged. Therefore, a short-circuited product and a potentially short-circuited product can be detected accurately in a short time. The voltage to be applied may be a constant voltage or a voltage increased at a constant speed.

A still further inspection method of the present invention is a method for inspecting a secondary battery precursor including a pair of electrodes and a separator disposed between the pair of electrodes, including: applying an inspection current between the pair of electrodes before an electrolyte solution is injected between the pair of electrodes, and measuring a voltage due to application of the inspection current; and determining the precursor to be defective if the voltage has a value beyond a predetermined allowable range calculated based on a voltage waveform when a current is applied to a normal secondary battery precursor. This method also has the same effect as achieved by the above-described methods. The inspection current may be a constant current, while it is not limited thereto.

The measurement of a current when a voltage is increased at a constant speed, or the measurement of a voltage when a constant current is applied may be performed by measuring its change value with respect to time differential. By using this method, the level of resolution in the measurement is improved, and a highly accurate inspection can be performed.

The inspection methods of the present invention can be applied even when the distance between the positive electrode and the negative electrode is approximately 25 μm or less.

In the above-described inspection methods, the inspection voltage may be less than 75 V per 1 μm thickness of the separator, or less than 35 V per 1 μm thickness of the separator. Further, in the above-described inspection methods, the inspection voltage may be 420 V or more.

In the above-described inspection methods, the secondary battery precursor is a precursor of a lithium secondary battery.

A method for manufacturing a secondary battery according to the present invention includes: manufacturing a secondary battery precursor including a pair of electrodes and a separator disposed between the pair of electrodes; and inspecting the secondary battery precursor by the above-described inspection methods of the present invention.

An inspection device of the present invention is a device for inspecting a secondary battery precursor including a pair or electrodes, and a separator disposed between the pair of electrodes, including: voltage application means for applying a voltage between the pair of electrodes; current measurement means for measuring a current flowing due to application of the voltage; storage means for storing a reference current value set based on a current when a voltage is applied to a normal secondary battery precursor; and arithmetic operation means for performing a predetermined arithmetic operation using the reference current value stored in the storage means and a value of the current measured by the current measurement means, so as to determine whether the secondary battery precursor is defective or not.

Another inspection device of the present invention is a device for inspecting a secondary battery precursor including a pair or electrodes, and a separator disposed between the pair of electrodes, including: current application means for applying a current between the pair of electrodes; voltage measurement means for measuring a voltage generated due to application of the current; storage means for storing a reference voltage value set based on a voltage when a current is applied to a normal secondary battery precursor; and arithmetic operation means for performing a predetermined arithmetic operation using the reference voltage value stored in the storage means and a value of the voltage measured by the voltage measurement means, so as to determine whether the secondary battery precursor is defective or not. Herein, the reference voltage value is obtained as a result of averaging 100 voltage waveforms obtained by measuring 100 normal secondary battery precursors.

In the description, the "secondary battery precursor" is used as a term indicating an uncompleted secondary battery including at least a pair of electrodes and a separator, such as a semifinished product referred to as an electrode body. The secondary battery precursor may include or may not include a battery case.

According to the present invention, an internally short-circuited secondary battery precursor and a secondary battery precursor that may become short-circuited internally after a battery is configured can be screened effectively in a short time. According to the present invention, even when the secondary battery precursor has a thin separator, a short-circuited product and a potentially short-circuited product can be eliminated from a production line effectively.

BEST MODE FOR CARRYING OUT THE INVENTION

Figure 1:
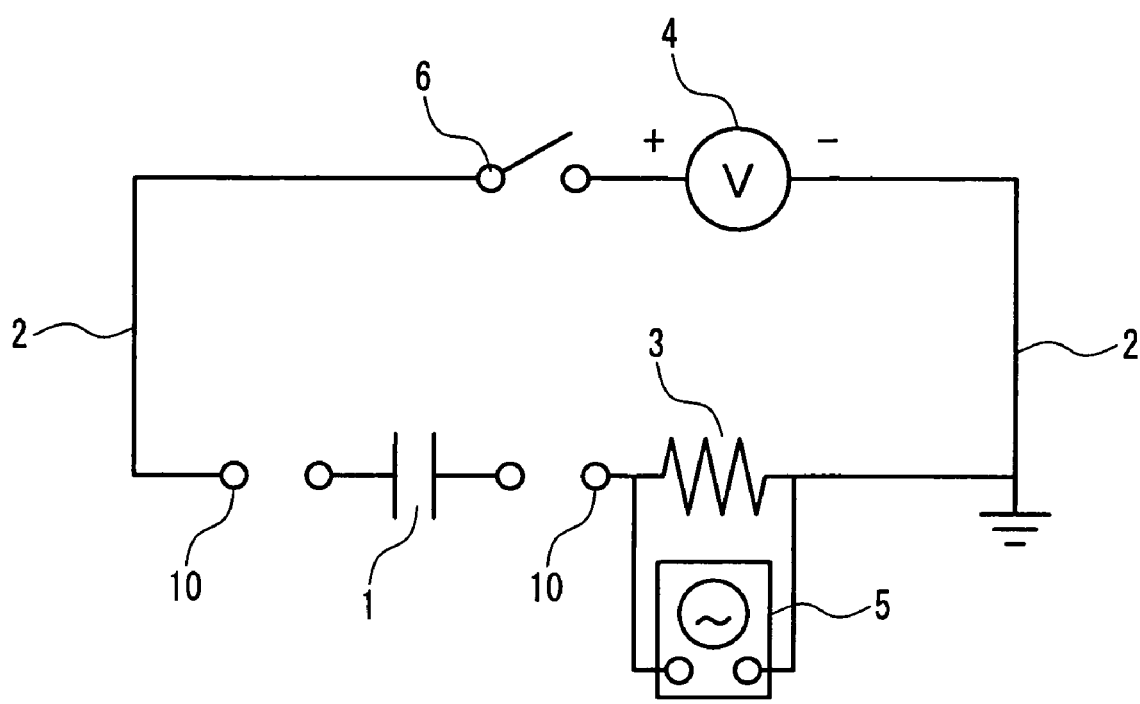
FIG. 1 is a circuit diagram of an exemplary inspection device of the present invention.

Hereinafter, embodiments of the present invention will be described with reference to the drawings.

Embodiment 1

In Embodiment 1, an inspection method and an inspection device of the present invention will be described.

If a foreign object is present between electrodes, or a separator is defective, an insulation distance between the positive and negative electrodes is reduced substantially. In this case, when an electrode body is charged, a discharge phenomenon (surface discharge) is likely to occur parallel to a surface of the separator as a porous material. By using the inspection method of the present invention, a current due to such a surface discharge can be detected. The surface discharge can be detected even if the distance between the positive and negative electrodes is extremely short. The surface discharge phenomenon includes a partial discharge phenomenon caused locally in the separator, and an arc discharge phenomenon caused between the positive and negative electrodes.

Hereinafter, the inspection method of the present invention will be described. The inspection method is a method for inspecting a secondary battery precursor (plate group) including at least a pair of electrodes (positive and negative electrodes), and a separator disposed between the pair of electrodes.

In a first inspection method of the present invention, a constant inspection voltage is applied between the pair of electrodes before an electrolyte solution is injected between the pair of electrodes, and a current flowing due to the application of the inspection voltage is measured. Then, the precursor is determined to be defective if a current value exceeding a previously set reference current value is detected within a time period corresponding to a time period between starting of voltage application when a voltage is applied to a normal secondary battery precursor and obtaining of a constant current.

When a voltage is applied to an electrode body in which the positive and negative electrodes are not short-circuited, the positive and negative electrodes are charged electrically, and a current flows. However, after a sufficient electrical charge, the flowing current converges on a minute constant current. When the voltage is applied to a normal secondary battery precursor, a time period between starting of the application and obtaining of the constant current is approximately 5-60 milliseconds, for example.

According to the present invention, when a voltage is applied to a normal secondary battery precursor, the inspection can be completed within the time period before the constant current is obtained. This is because an abnormal current due to a surface discharge, which is characteristic in a short-circuited or potentially short-circuited product is observed in a time period during which a charge is given between the pair of electrodes. The inspection method allowing a short-time inspection is introduced to a mass production process advantageously.

The reference current value can be set based on a current when a voltage is applied to a normal secondary battery precursor. It is preferable that a plurality of reference current values are set depending upon time. By setting a plurality of reference current values that differ depending upon time based on a charging current waveform when the voltage is applied to the normal secondary battery precursor, the accuracy of the inspection can be improved. It is preferable that the reference current value is set to be higher than the current waveform measured with respect to the normal precursor by a predetermined rate or value. In order to improve the accuracy of the inspection further, the reference current values may be set intermittently or continuously at intervals of 1 millisecond or less (e.g., 50-500 microseconds).

In a second inspection method of the present invention, an inspection voltage is applied between the pair of electrodes before an electrolyte solution is injected between the pair of electrodes, and a current flowing due to the application of the inspection voltage is measured. Then, the precursor is determined to be defective if the measured current has a value beyond a predetermined allowable range calculated based on a current waveform (reference waveform) when a voltage is applied to a normal secondary battery precursor.

In the second method, while the allowable range may be set as appropriate, it actually may be set so that the upper limit value thereof corresponds to the trajectory of a waveform that is 5-20% higher than the reference waveform. Also in this case, in order to improve the accuracy of the inspection, an interval of current measurement may be set as short as the above-described intervals. Further, in the second method, a constant voltage or a voltage increased at a constant speed may be used as the inspection voltage.

In a third inspection method of the present invention, an inspection current is applied between the pair of electrodes before an electrolyte solution is injected between the pair of electrodes, and a voltage due to the application of the inspection current is measured. Then, the precursor is determined to be defective if the measured voltage has a value beyond a predetermined allowable range calculated based on a voltage waveform when a current is applied to a normal secondary battery precursor. The inspection current may be a constant current.

In the inspection methods of the present invention, in order to realize a nondestructive inspection, the voltage to be applied may be less than 75 V, preferably 62.5 V or less, per 1 μm thickness of the separator. When the voltage is 62.5 V or less, an arc discharge phenomenon in a non-defective product does not occur, whereby the possibility of damaging a product during the inspection can be prevented. For example, when the separator has a thickness of 20 μm, the voltage to be applied is less than 1500 V, preferably 1250 V or less in particular. In order to suppress a partial discharge phenomenon reliably, the voltage to be applied may be set less than 35 V per 1 μm thickness of the separator. The above-described value of the voltage to be applied indicates a maximum value, which should correspond to a set voltage value in the case of an inspection performed by the application of a constant voltage, or a voltage value obtained when the voltage application is finished in the case of an inspection with a voltage increased at a constant speed.

The present invention achieves a remarkable effect when the separator has a thickness of 25 μm or less, while it is not limited particularly thereto. In the present invention, while a kind of the secondary battery precursor to be applied is not limited, a precursor of a lithium ion secondary battery with a thin separator may be applied easily.

While the lower limit value of a preferable range of the voltage to be applied differs depending upon a precursor to be inspected, a voltage of 20 V or more per 1 μm thickness of the separator is preferable. For example, when the separator has a design thickness of 20 μm±1 μm, a voltage of 420 V or more is preferable.

Hereinafter, an example of the present invention will be described with reference to the drawings. To inspect a secondary battery precursor, an inspection device as schematically shown in FIG. 1 may be used, for example.

The inspection device includes a conductor 2, a resistance 3, a power source 4, an oscilloscope 5, a switch 6, and terminals 10. The two terminals 10 are connected with a pair of electrodes of a secondary battery precursor 1 to which an electrolyte solution is not injected yet.

The power source 4 serves as voltage application means for applying a voltage to the pair of electrodes of the secondary battery precursor 1 via the conductor 2. The oscilloscope 5 is connected in parallel with the resistance 3, so as to convert a voltage at both ends of the resistance 3 to a current value. The oscilloscope 5 serves as current measurement means for measuring a current flowing due to the application of the voltage. As the oscilloscope 5, one that is provided with a memory and an arithmetic processing unit may be used. The memory stores a reference current value set based on a current when a voltage is applied to a normal secondary battery precursor. The arithmetic processing unit performs a predetermined arithmetic operation using the reference current value stored in the memory and the measured current value, thereby determining whether the secondary battery precursor 1 is defective or non-defective. The memory and the arithmetic processing unit may be provided separately from the oscilloscope 5, for which a computer may be used, for example.

In the case of performing an inspection by monitoring a voltage waveform, the power source 4 serves as means for applying a predetermined current. The oscilloscope serves as means for measuring a voltage generated due to the application of the current. The memory stores a reference voltage value set based on a voltage when a current is applied to a normal secondary battery precursor. The arithmetic processing unit performs a predetermined arithmetic operation using the reference voltage value stored in the storage means and the voltage value measured by the voltage measurement means, thereby determining whether the precursor is defective or not.

In the inspection, the two terminals 10 are connected electrically to the pair of electrodes of the secondary battery precursor 1, respectively. It does not matter which of the two terminals 10 is connected to a positive electrode of the secondary battery precursor 1. When the switch 6 is closed in the state where a voltage is applied from the power source 4, an abnormal waveform may be generated in consequence of chattering caused when the switch 6 comes into contact with the conductor 2. In view of this, to improve the accuracy of the determination, the application of the voltage may be started after the switch 6 is turned on. For the same reason, when the inspection is completed, the switch 6 may be opened after the application of the voltage is finished.

As the oscilloscope 5 as the current measurement means, one that has the function of previously storing a normal charging current waveform as a reference waveform may be used. When the secondary battery precursor 1 is charged, the oscilloscope 5 converts a voltage at the both ends of the resistance 3 to a current value at predetermined time intervals, to draw a charging current waveform corresponding to the reference waveform, and performs a predetermined arithmetic operation on the charging current waveform based on the reference waveform. For example, the oscilloscope 5 calculates the difference between the measured current value and a current value on the reference waveform. Then, the oscilloscope 5 determines whether or not the calculation result is within a predetermined allowable range, and preferably outputs the result of the determination.

Figure 2:
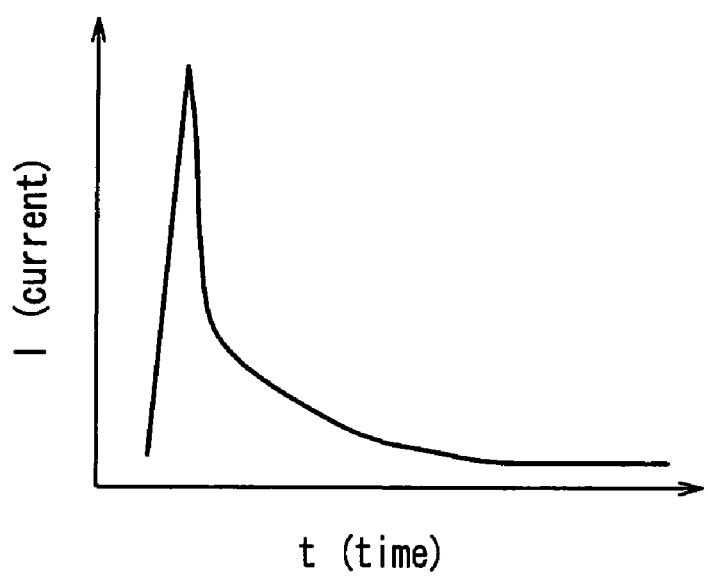
FIG. 2 is a diagram showing an exemplary charging current waveform when a constant voltage is applied to a non-defective secondary battery precursor.

When a constant voltage is applied, roughly three kinds of charging current waveforms are observed from the secondary battery precursor 1. The first waveform is a waveform of a non-defective product as exemplified in FIG. 2. As shown in FIG. 2, on this waveform, a peak appears immediately after the application of the voltage due to an inrush current to the secondary battery precursor, and thereafter, the current decreases with time.

Figure 3:
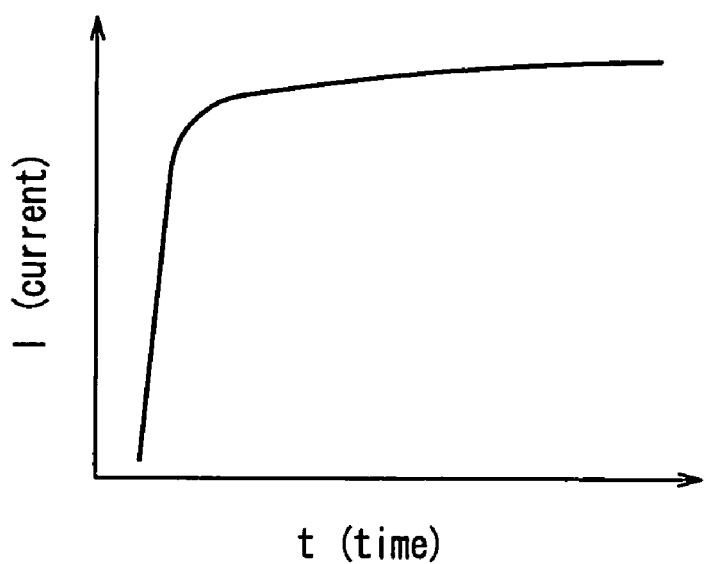
FIG. 3 is a diagram showing an exemplary charging current waveform when a constant voltage is applied to an internally short-circuited secondary battery precursor.

The second waveform is a waveform of an internally short-circuited product as exemplified in FIG. 3. As shown in FIG. 3, a peak due to the inrush current is not observed on this waveform, and a large current flows continuously from the start of the voltage application until the end of the measurement.

Figure 4:
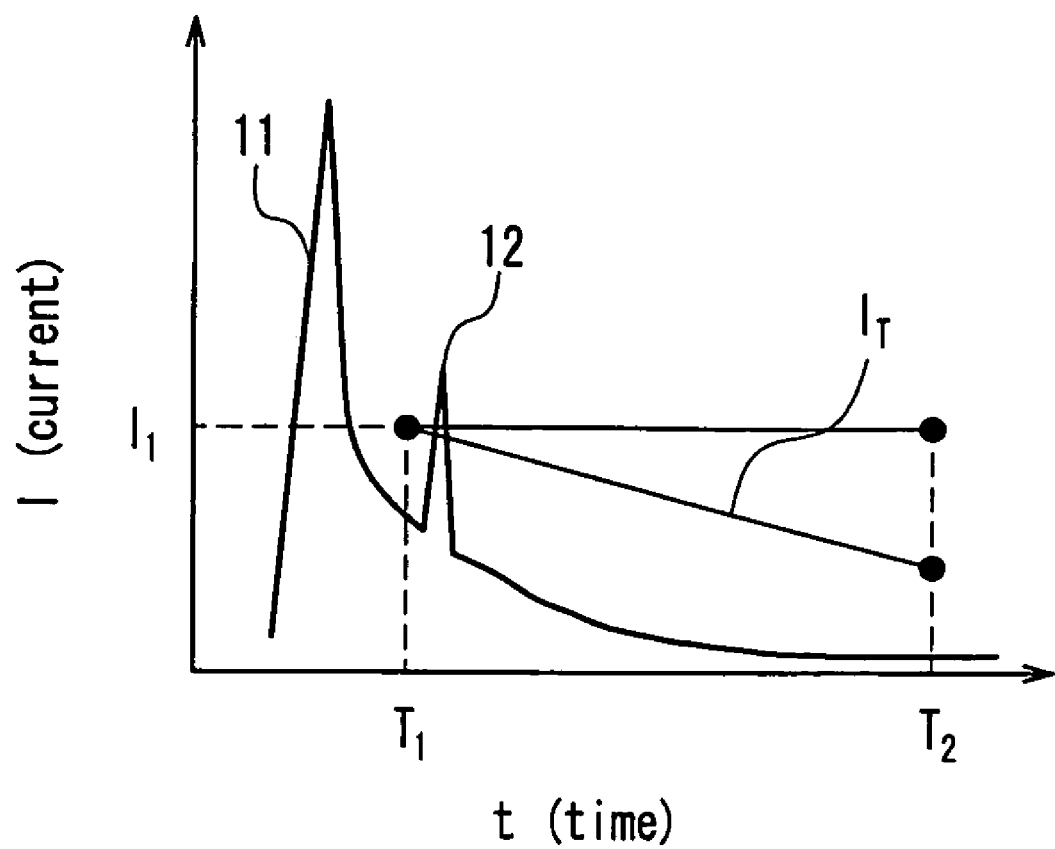
FIG. 4 is a diagram showing an exemplary charging current waveform when a secondary battery precursor that may become short-circuited internally has a constant voltage.

The third waveform is a waveform of a potentially short-circuited product that may become short-circuited internally in the future. As shown in FIG. 4, on this waveform, a peak 11 due to the inrush current exists, and thereafter, the current decreases as on the waveform of the non-defective product. However, on this waveform, a discharge phenomenon due to a surface discharge, which is not seen on the waveform of the normal product, is observed after the peak 11 due to the inrush current. In many cases, this discharge (electric leakage) occurs temporarily, and the current converges on the same value as that of the non-defective product again. As described above, the abnormal waveform suggesting a defect in an internal structure often appears on the waveform as a peak 12 smaller than the peak 11 due to the inrush current. By capturing the peak 12 due to the abnormal current, a secondary battery precursor that may become short-circuited internally can be detected as well as a secondary battery precursor that already is short-circuited internally. As shown in FIG. 4, the secondary battery precursor that may become short-circuited internally in the future (potentially defective product) may show the same behavior as that of the non-defective secondary battery precursor after a certain period of elapsed time (e.g., after $T_2$ in FIG. 4). In such a case, the potentially defective product cannot be detected by a conventional method of measuring a resistance value after the certain period of elapsed time. In contrast, the method of the present invention allows detection of the potentially defective product by observing a surface discharge within a predetermined period of time.

To assure the accuracy of the inspection, it is preferable that the reference waveform is set based on charging current waveforms obtained from at least 100 non-defective products. An average waveform of the charging current waveforms may be adopted as the reference waveform. Further, the reference waveform for defining the upper limit value may be defined based on the maximum waveform, and the reference waveform for determining the lower limit value may be defined based on the minimum waveform. Then, the reference current value (upper limit value in the allowable range) is calculated from a current value on the reference waveform based on a predetermined relational expression. For example, the upper limit value in the allowable range may be a value higher than the current value on the reference waveform by a predetermined rate or amount (e.g., a value higher than the average value of the normal waveforms by a value twice to ten times as high as the difference between the maximum value thereof and the average value).

Figure 5:
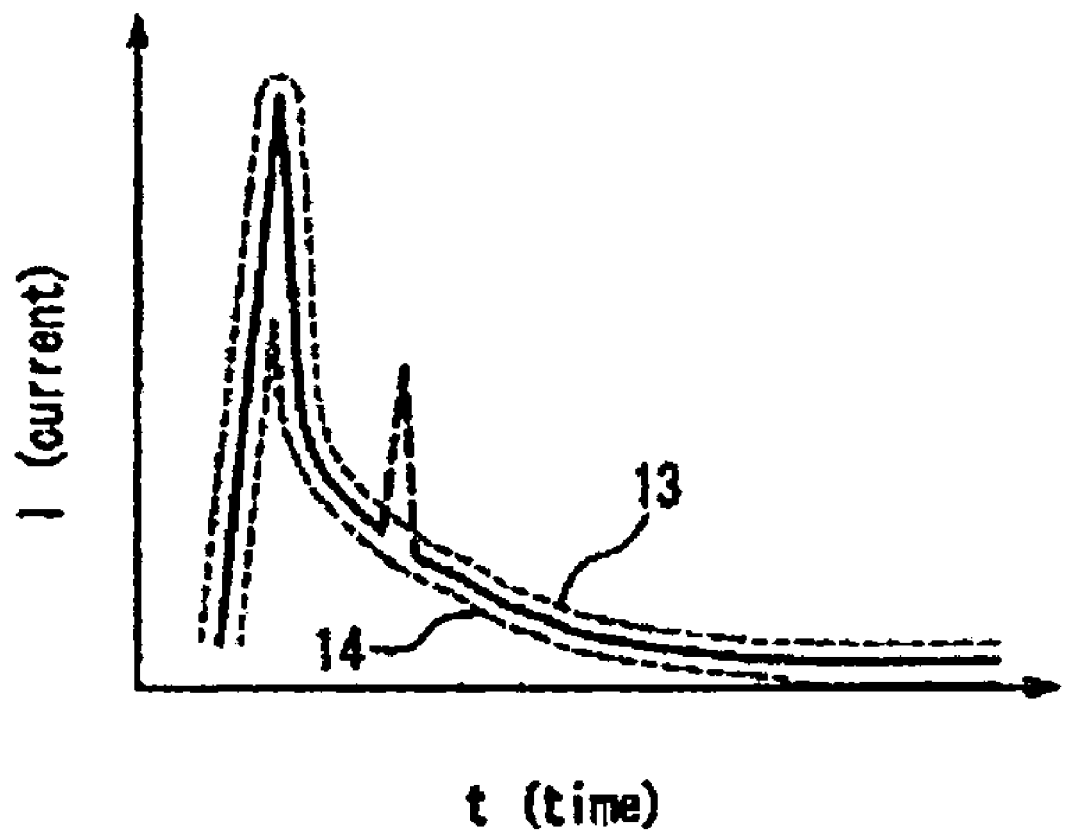
FIG. 5 is a diagram showing an exemplary relationship between a charging current waveform of a secondary battery precursor and a reference current value.

FIG. 5 shows an exemplary relationship between the reference waveform and a reference current value 13, 14. In the example shown in FIG. 5, reference value 14 also is set below the reference waveform based on the reference waveform. When a current value lower than the reference value 14 is detected, there is a need to consider the possibility of a failure of the inspection itself. An abnormally low current value is obtained due to poor electrical contact between the terminals of the inspection device and an electrode body, for example.

As described above, according to one preferable embodiment of the present invention, based on a current when a voltage is applied to a normal secondary battery precursor, the reference current value (upper limit value) higher than the current and the reference value (lower limit value) lower than the current are set. When a current value higher than the upper limit value is measured, the precursor is determined to be a defective product, and when a current value lower than the lower limit value is set, the precursor is determined to be a product to be inspected again or a defective product. The reference value determining the lower limit of the current value may be a value lower than the current value on the reference waveform by a predetermined rate or amount (e.g., a value lower than the average value of the normal waveforms by a value twice to ten times as high as the difference between the minimum value thereof and the average value).

It is not necessarily required that the value for comparison is set based on the charging current waveform obtained from a non-defective product. As shown in FIG. 4, for example, it is possible to determine that the abnormal current is detected when a current value exceeding a previously set predetermined value ($I_1$) is measured in a predetermined time period ($T_2$-$T_1$) within the range between starting of the application of the voltage and obtaining of a constant current value. Instead of the predetermined value ($I_1$), a value ($I_T$) set as a function of time may be used as the reference value. Although this inspection method has a lower accuracy than that of the method using the charging current waveform, it can be performed easily when the charging current waveform of the non-defective product can be estimated.

Figure 6:
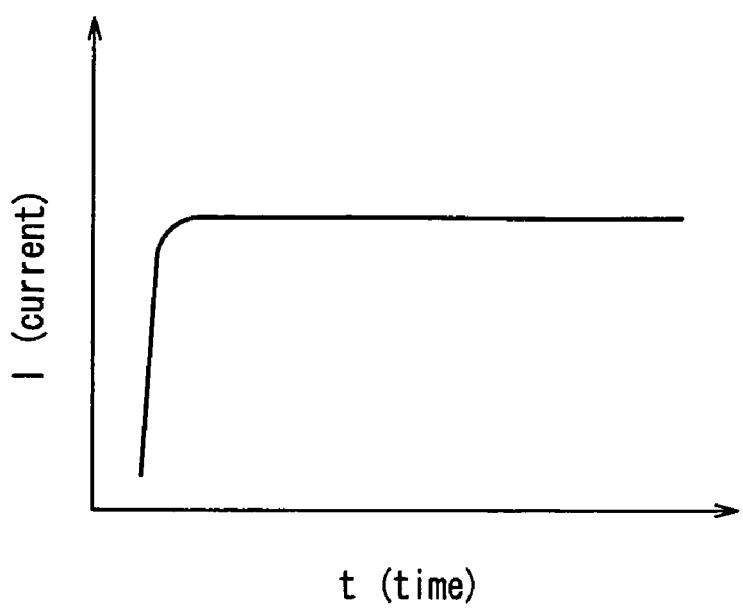
FIG. 6 is a diagram showing an exemplary charging current waveform when a voltage increased at a constant speed is applied to a non-defective secondary battery precursor.

Also in the case where a voltage is increased at a constant speed, three typical kinds of current waveforms are observed as in the case of applying the constant voltage. The first waveform is a waveform of a non-defective product as exemplified in FIG. 6. As shown in FIG. 6, on this waveform, a behavior due to an increase in current is observed immediately after the application of the voltage, and while the voltage is increased, a constant current is observed continuously until the application of the voltage is finished.

Figure 7:
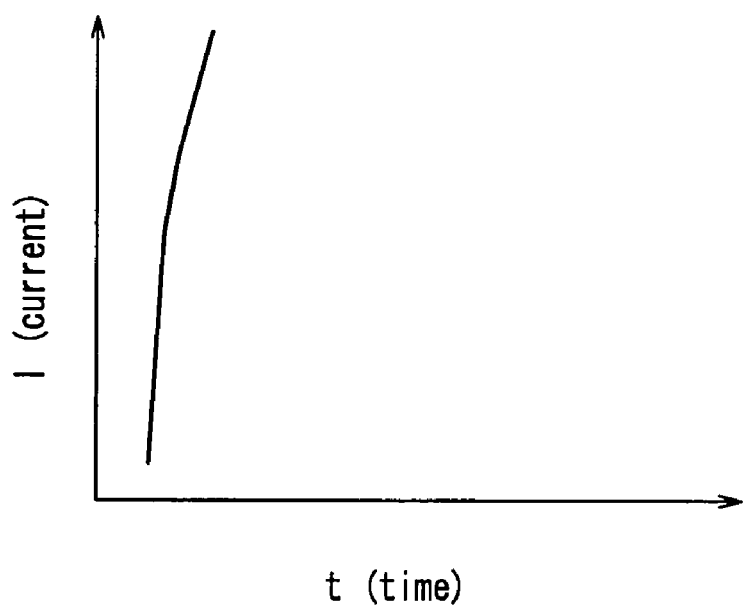
FIG. 7 is a diagram showing an exemplary charging current waveform when a voltage increased at a constant speed is applied to an internally short-circuited secondary battery precursor.

The second waveform is a waveform of an internally short-circuited product as exemplified in FIG. 7. As shown in FIG. 7, in this case, a large current flows continuously from the start of the voltage application until the end of the measurement.

Figure 8:
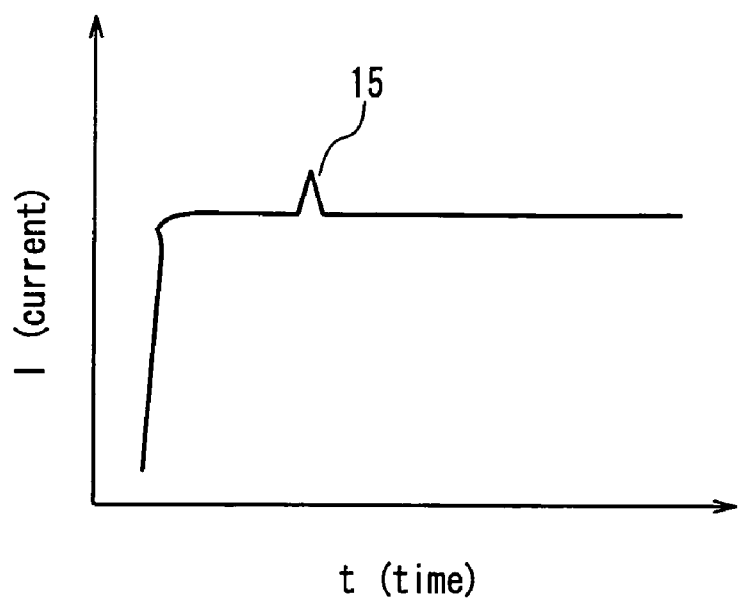
FIG. 8 is a diagram showing an exemplary charging current waveform when a voltage increased at a constant speed is applied to a secondary battery precursor that may become short-circuited internally.

The third waveform is a waveform of a potentially short-circuited product that may become short-circuited internally in the future as exemplified in FIG. 8. As shown in FIG. 8, on this waveform, an increase in current is observed immediately after the start of the voltage application as on the waveform of the non-defective product. Thereafter, although a constant current flows, a discharge phenomenon (peak 15) due to a surface discharge, which is not seen on the waveform of the normal product, is observed while the constant current flows. In many cases, this discharge (electric leakage) occurs temporarily, and the current converges on the same value as that of the non-defective product again. By capturing the abnormal current (peak 15), a secondary battery precursor that may become short-circuited internally can be detected as well as an internally short-circuited secondary battery precursor.

Also in the inspection with a voltage increased at a constant speed, to assure the accuracy of the inspection, it is preferable that the reference waveform is set based on charging current waveforms obtained from at least 100 non-defective products. An average waveform of the charging current waveforms may be adopted as the reference waveform. Further, the reference waveform for defining the upper limit value may be defined based on the maximum waveform, and the reference waveform for determining the lower limit value may be defined based on the minimum waveform. Then, the reference current value (upper limit value in the allowable range) is calculated from a current value on the reference waveform based on a predetermined relational expression. For example, the reference current value may be a value higher than the current value on the reference waveform by a predetermined rate or amount (e.g., a value higher than the average value of the normal waveforms by a value twice to ten times as high as the difference between the maximum value thereof and the average value).

Figure 12:
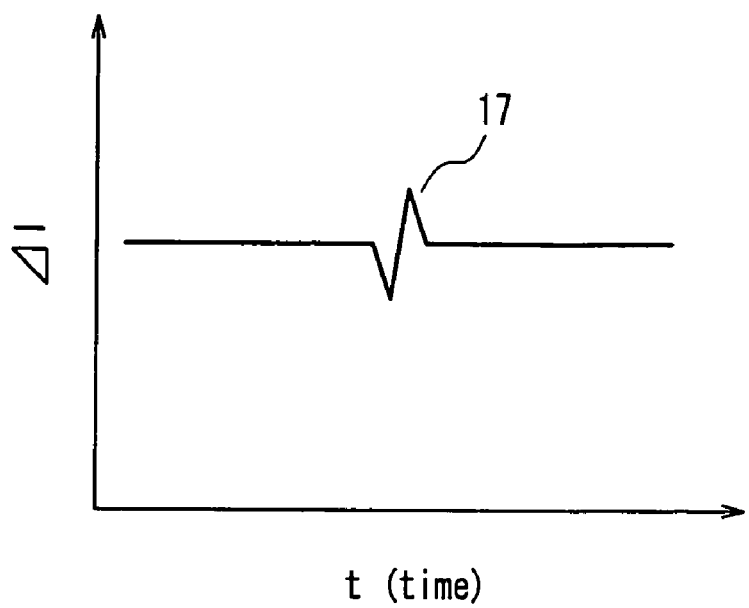
FIG. 12 is a diagram showing an exemplary differential value of a current when a voltage is applied to a secondary battery precursor that may become short-circuited internally.

At this time, considering the resolution level of the oscilloscope, a differential change of a current with respect to time may be measured. Consequently, as shown in FIG. 12, an area 17 in which a differential value fluctuates wildly is observed with respect to a potentially short-circuited product that may become short-circuited internally in the future, resulting in a highly accurate inspection.

Figure 9:
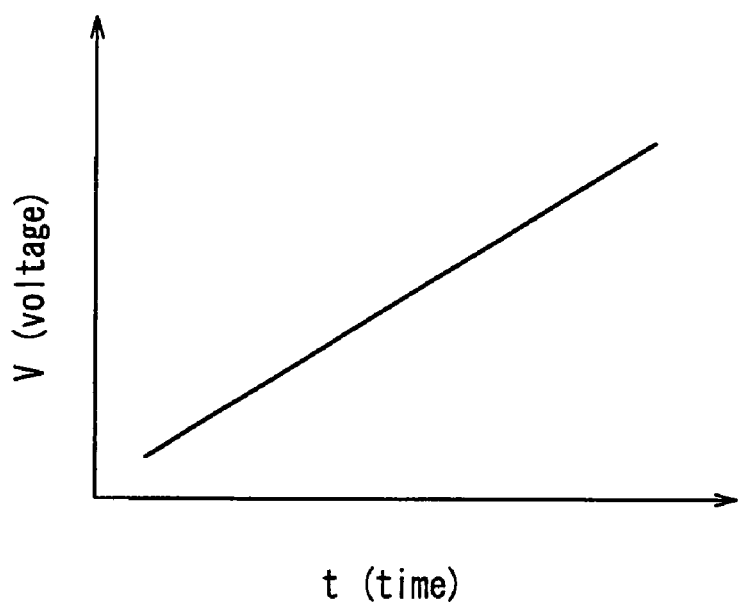
FIG. 9 is a diagram showing an exemplary voltage waveform when a constant current is applied to a non-defective secondary battery precursor.
Figure 10:
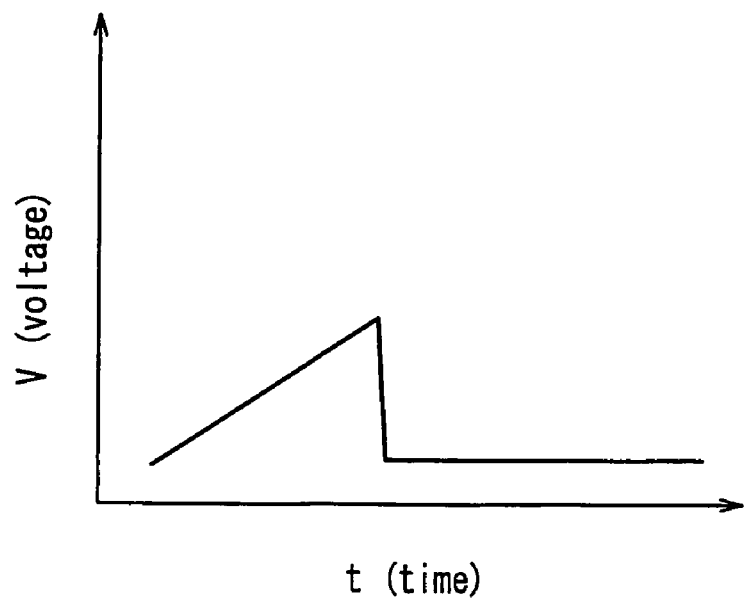
FIG. 10 is a diagram showing an exemplary voltage waveform when a constant current is applied to an internally short-circuited secondary battery precursor.
Figure 11:
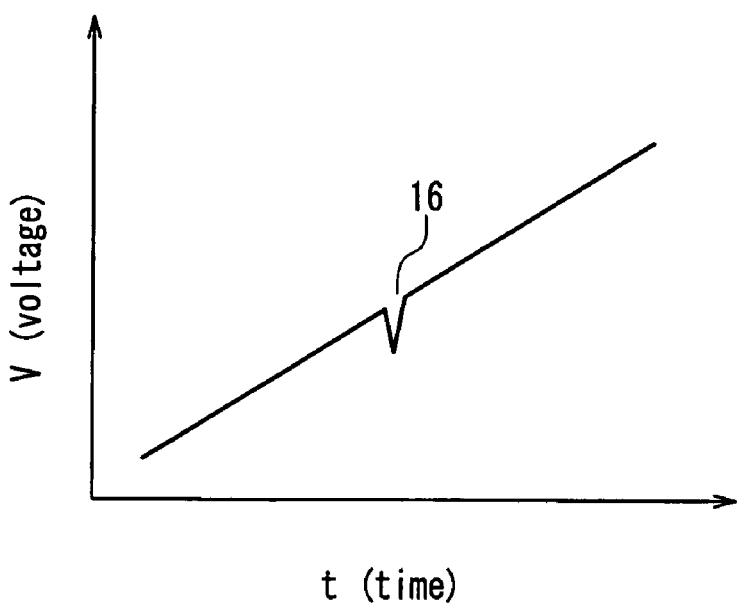
FIG. 11 is a diagram showing an exemplary voltage waveform when a constant current is applied to a secondary battery precursor that may become short-circuited internally.

In the inspection method performed by applying a constant current, three typical kinds of voltage waveforms are observed. The three kinds of voltage waveforms are exemplified in FIGS. 9-11. FIG. 9 shows an exemplary voltage waveform observed with respect to a non-defective electrode body. FIG. 10 shows an exemplary voltage waveform observed with respect to an internally short-circuited electrode body. FIG. 11 shows an exemplary voltage waveform observed with respect to an electrode body that may become short-circuited internally in the future. With respect to the potentially short-circuited product, a temporary voltage drop 16 as shown in FIG. 11 is observed. Therefore, the method of monitoring the voltage waveform has the same effect as that of the method of monitoring the current waveform.

Figure 13:
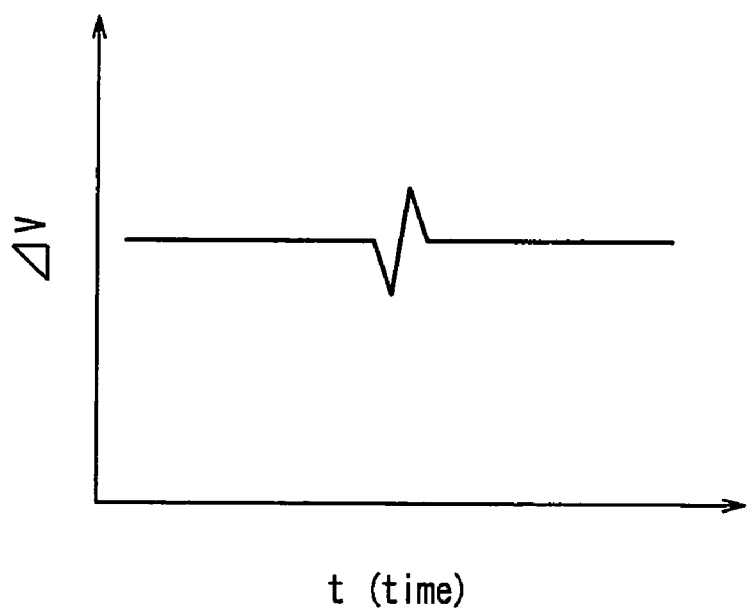
FIG. 13 is a diagram showing an exemplary differential value of a voltage when a constant current is applied to a secondary battery precursor that may become short-circuited internally.

At this time, considering the resolution level of the oscilloscope, a differential change of a voltage with respect to time may be measured. Consequently, as shown in FIG. 13, an area in which a differential value fluctuates wildly is observed with respect to a potentially short-circuited product that may become short-circuited internally in the future, resulting in a highly accurate inspection.

Here, the description is given only of the case where a voltage is increased at a constant speed, or a charge is performed with a constant current. However, a voltage or a current with a complex pattern may be applied. The detection of a defective product can be performed similarly to the above-described method as long as the reference waveform can be determined and the allowable range thereof can be set.

Embodiment 2

In Embodiment 2, a description will be given of an exemplary method for manufacturing a secondary battery of the present invention.

The secondary battery to be manufactured in the present invention is, for example, a nickel metal hydride battery, a lithium ion secondary battery, and the like. Among them, a lithium ion secondary battery with a thin separator (e.g., 25 µm or less) is particularly suitable.

The manufacturing method of the present invention is characterized in that a secondary battery precursor before being brought into contact with an electrolyte solution is inspected by the inspection method of the present invention. Other manufacturing processes may be realized by well-known manufacturing methods. Further, components of the battery may be formed with well-known components. Hereinafter, an exemplary manufacture of a lithium ion secondary battery will be described.

Initially, a secondary battery precursor including a pair of electrodes and a separator disposed between the pair of electrodes is manufactured. The secondary battery precursor can be formed by winding the positive electrode and the negative electrode with the separator sandwiched therebetween. Further, the secondary battery precursor also can be formed by alternately laminating a plurality of positive electrodes and negative electrodes with the separators sandwiched therebetween. The positive electrode, the negative electrode, and the separator may be formed with a well-known positive electrode, negative electrode, and separator, respectively. When the separator has a thickness of 25 μm or less, the effect of the present invention is particularly remarkable.

Next, the secondary battery precursor is inspected by the inspection method of Embodiment 1 so that a defective product is detected. This inspection may be performed before the secondary battery precursor is brought into contact with an electrolyte solution.

Then, a secondary battery precursor determined to be non-defective by the inspection is disposed in a battery case with a non-aqueous electrolyte solution. Then, the battery case is sealed. In this manner, the lithium ion secondary battery is manufactured. Further, the secondary battery precursor may be inspected after the secondary battery precursor is contained in the battery case before the electrolyte solution is injected into the battery case.

Figure 14:
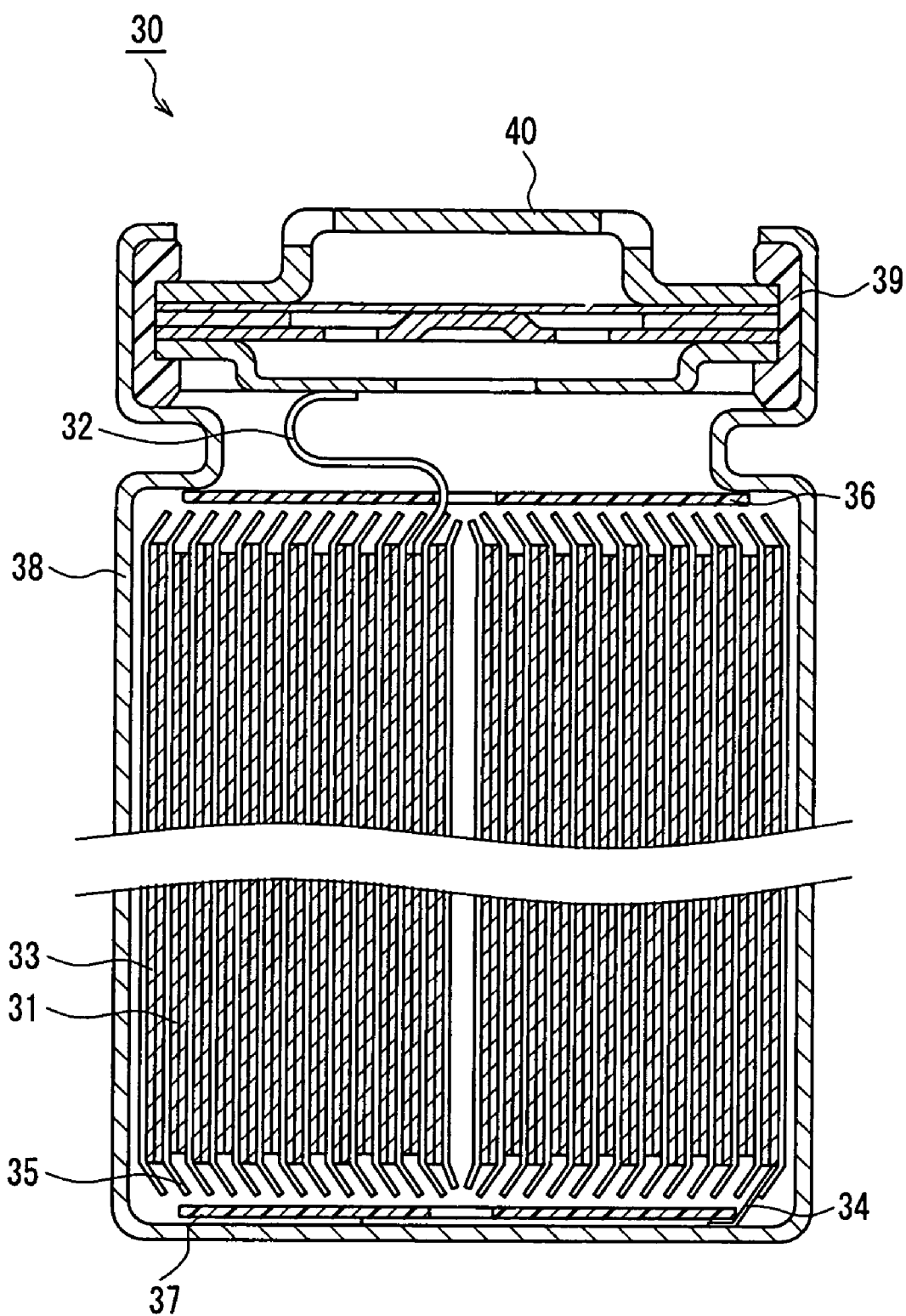
FIG. 14 is a cross sectional view schematically showing an exemplary secondary battery to be manufactured by a manufacturing method of the present invention.
Figure 15:
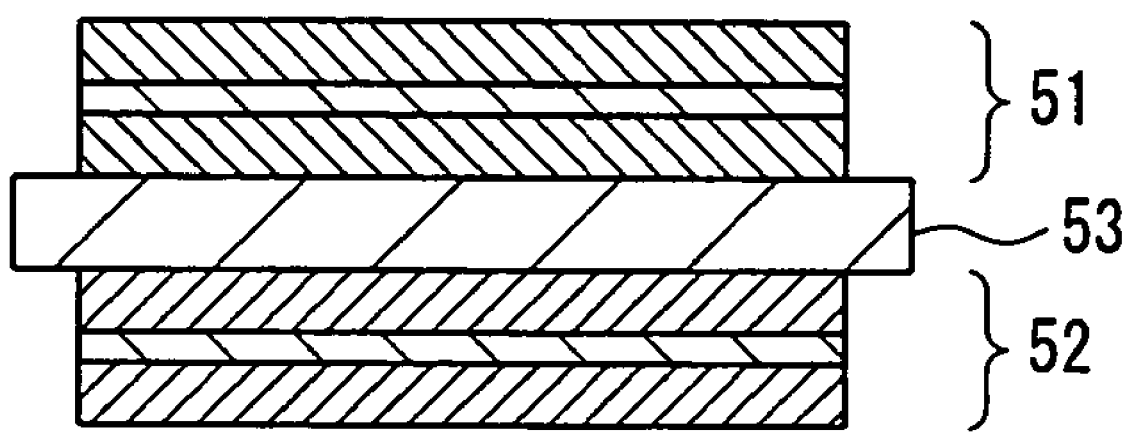
FIG. 15 is a cross sectional view schematically showing an electrode body produced in an example.

FIG. 14 is a diagram schematically showing a cross section of an exemplary lithium ion secondary battery to be manufactured by the above-described method. With reference to FIG. 14, a lithium ion secondary battery 30 includes a positive electrode 31, a positive electrode lead 32, a negative electrode 33, a negative electrode lead 34, a separator 35, an upper insulating plate 36, a lower insulating plate 37, a battery case 38, an insulating gasket 39, a cover 40, and a non-aqueous electrolyte solution (not shown) sealed in the battery case 38.

The positive electrode 31 and the negative electrode 33 are wound spirally with the separator 35 disposed therebetween, whereby a plate group (battery element) is configured. The plate group is contained in the battery case 38. The positive electrode 31 is connected with the positive electrode lead 32, which electrically connects the cover 40 serving also as a positive electrode terminal and the positive electrode 31. The negative electrode 33 is connected with the negative electrode lead 34. The negative electrode lead 34 electrically connects the battery case 38 serving also as a negative electrode terminal and the negative electrode 33. The battery case 38 is sealed with the insulating gasket 39 and the cover 40. Both the positive electrode 31 and the negative electrode 33 are plates that reversibly occlude and release lithium.

The components of the lithium ion secondary battery 30 may be formed with conventionally used or proposed components. For example, as a positive active material, a complex oxide (e.g., $LiCoO_2$) containing lithium can be used. As a negative active material, a carbon material or an alloy material that occludes and releases lithium can be used, for example. As the non-aqueous electrolyte solution, an electrolyte solution obtained by dissolving a lithium salt in a non-aqueous solvent (e.g., ethylene carbonate or ethyl methyl carbonate) can be used.

According to the manufacturing method of Embodiment 2, a secondary battery with high reliability can be manufactured in a highly productive manner. The battery described in Embodiment 2 is an exemplary battery to be manufactured by the method of the present invention, and the present invention is not limited thereto.

EXAMPLE

Hereinafter, the present invention will be described in further detail by way of an example. However, the present invention is not limited to the example described below.

Initially, an electrode body of a secondary battery (secondary battery precursor) was produced. A positive plate 51 was produced by applying a paste containing lithium cobaltate (main component) and acetylene black to both surfaces of an aluminum foil. At this time, a collector lead was welded to a part of the aluminum foil instead of applying the paste thereto. A negative plate 52 was produced by applying a paste containing graphite as a main component to both surfaces of a copper foil. At this time, a collector lead was welded to a part of the copper foil instead of applying the paste thereto.

The positive plate 51 and the negative plate 52 were laminated and wound with a separator 53 sandwiched therebetween, whereby the electrode body was obtained. A porous film (thickness of 20 μm) made of polyethylene was used for the separator 53. FIG. 13 schematically shows the structure of the electrode body. While the structure shown in FIG. 13 differs from an actual structure, the positive plate 51 and the negative plate 52 are opposed to each other with the separator 53 sandwiched therebetween.

In this manner, a non-defective electrode body was produced. In addition, in this example, three kinds of defective electrode bodies were produced intentionally. One electrode body was produced using a separator cut for 5 mm. Another electrode body was produced by allowing 5 grains of stainless steel (SUS) abrasive powder, each having a grain diameter of 45 μm or more and less than 75 μm, to be mixed between the positive plate 51 and the separator 53. Still another electrode body was produced by allowing 5 grains of stainless steel abrasive powder, each having a grain diameter of 45 μm or more and less than 75 μm, to be mixed between the negative plate 52 and the separator 53.

The number of these four kinds of electrode bodies produced was 100 each. Then, a charging current waveform was measured with respect to each of the four kinds of electrode bodies using an inspection device having the same circuit as shown in FIG. 1. A resistance of 100 KΩ was used as the resistance 3, and TS-4262 produced by IWATSU was used as the oscilloscope 5. A DC voltage outputted from the power source was 250 V, 500 V, 750 V, 1000 V, 1250 V, or 1500V. A time period during which the voltage was applied, i.e., a time period for which the charging current waveform was monitored for determination as to whether the electrode body was defective was 0.5 second, and an interval of the measurement was 50 μs. If the electrode body is normal and non-defective, charging is completed and an almost constant current is measured in 0.5 second at the latest even with any of the above-described voltages applied.

On the other hand, with respect to 500 non-defective electrode bodies produced in addition to the above, charging current waveforms were measured, an average waveform thereof was obtained, and the maximum and minimum waveforms were selected, respectively. Then, a waveform higher than the maximum waveform by 20% of the difference between the average waveform and the maximum waveform was set as a reference waveform defining the upper limit value. Similarly, a waveform lower than the minimum waveform by 20% of the difference between the average waveform and the minimum waveform was set as a reference waveform defining the lower limit value. The range between the upper limit value and the lower limit value was considered as an allowable range for the measured charging current waveforms, i.e., a range of a non-defective product.

The reference waveform was set individually with respect to each voltage value. However, when a voltage of 1500 V was applied, an abnormal waveform due to an arc discharge was observed also with respect to the non-defective products (normal products), whereby the reference waveform was not set. An electrode body with respect to which a current value beyond the allowable range was measured even once within 0.5 second of measurement was determined to be defective, and an electrode body with respect to which no abnormal current value was measured was determined to be non-defective. The inspection was performed at a temperature 30° C. lower than the dew point. The result of the inspection is shown in Table 1.

TABLE 1

| Applied voltage | No processing (normal product) | | Cut separator | | Abrasive powder mixed (positive electrode/separator) | | Abrasive powder mixed (negative electrode/separator) | |
|---|---|---|---|---|---|---|---|---|
| | Determined to be defective | Determined to be non-defective | Determined to be defective | Determined to be non-defective | Determined to be defective | Determined to be non-defective | Determined to be defective | Determined to be non-defective |
| 250 V | 0/100 | 100/100 | 100/100 | 0/100 | 48/100 | 52/100 | 3/100 | 97/100 |
| 500 V | 0/100 | 100/100 | 100/100 | 0/100 | 85/100 | 15/100 | 26/100 | 74/100 |
| 750 V | 0/100 | 100/100 | 100/100 | 0/100 | 100/100 | 0/100 | 53/100 | 47/100 |
| 1000 V | 0/100 | 100/100 | 100/100 | 0/100 | 100/100 | 0/100 | 81/100 | 19/100 |
| 1250 V | 0/100 | 100/100 | 100/100 | 0/100 | 100/100 | 0/100 | 100/100 | 0/100 |

In the present example, there was no electrode body with respect to which a current value lower than the lower limit value was detected. When a voltage of 1500 V was applied, an abnormal waveform was obtained with respect to all the electrode bodies including the normal products, and thus they were determined as defective.

When a voltage of 1250 V or less was applied, no abnormal waveform was seen with respect to the normal products. With respect to the three kinds of defective electrode bodies, a rate of detecting a defective product increased as a higher voltage was applied. All the electrode bodies with a separator cut for 5 mm were determined to be defective when any voltages were applied. The electrode bodies in which the abrasive powder was mixed between the negative plate and the separator were determined to be defective at a relatively low rate. However, also in this case, all the electrode bodies were determined to be defective by optimizing the set voltage. An optimum voltage to be applied in the case of inspecting the electrode bodies in which the abrasive powder was mixed was higher than an optimized voltage to be applied in the case of inspecting the electrode bodies with a cut separator. This is attributed to the fact that the separator with the abrasive powder was less damaged than the cut separator, and has a longer distance of a surface discharge occurring in the separator than that of the cut separator.

INDUSTRIAL APPLICABILITY

The present invention can be applied to a method and a device for inspecting a precursor (plate group) of a secondary battery, and a method for manufacturing the secondary battery.

The invention claimed is:

1. A method for manufacturing a secondary battery comprising: making a secondary battery precursor including a pair of electrodes and a separator disposed between the pair of electrode ; and inspecting the secondary battery precursor,
   wherein the step of inspecting the secondary battery precursor comprises:
   applying a constant inspection voltage between the pair of electrodes before an electrolyte solution is injected between the pair of electrodes, and measuring a current flowing due to application of the inspection voltage at intervals of 1 ms or less; and
   determining the precursor to be defective if a current value exceeding a previously set reference current value is detected within a time period corresponding to a time period between an appearance of peak current due to an inrush current and obtaining of a constant current when a voltage is applied to a normal secondary battery precursor, the time period being within 60 milliseconds from starting of the application of the inspection voltage.

2. The method for manufacturing a secondary battery according to claim 1, wherein the reference current value is set based on a current when a voltage is applied to a normal secondary battery precursor.

3. The method for manufacturing a secondary battery according to claim 1, wherein a plurality of reference current values are set depending upon time.

4. The method for manufacturing a secondary battery according to claim 1, wherein the inspection voltage is set to be within a range between 20V and 75 V per 1 μm thickness of the separator.

5. The method for manufacturing a secondary battery according to claim 1, wherein the inspection voltage is set to be within a range between 20V and 35 V per 1 μm thickness of the separator.

6. The method for manufacturing a secondary battery according to claim 1, wherein the inspection voltage is set to be within a range between 420 V and 1575V.

7. The method for manufacturing a secondary battery according to claim 1, wherein the separator has a thickness of 25 μm or less.

8. The method for manufacturing a secondary battery according to claim 1, wherein the secondary battery precursor is a precursor of a lithium secondary battery.

9. A method for manufacturing a secondary battery comprising: making a secondary battery precursor including a pair of electrodes and a separator disposed between the pair of electrodes; and inspecting the secondary battery precursor, wherein the step of inspecting the secondary battery precursor comprises:

applying an inspection voltage between the pair of electrodes before an electrolyte solution is injected between the pair of electrodes, and measuring a current flowing due to application of the inspection voltage at intervals of 1 ms or less; and determining the precursor to be defective if the current has a value beyond a predetermined allowable range within 60 milliseconds from starting of the application of the inspection voltage, the allowable range being calculated based on a current waveform when a voltage is applied to a normal secondary battery precursor.

10. The method for manufacturing a secondary battery according to claim 9, wherein the inspection voltage is constant;

the measured current is compared with a previously set reference current value calculated based on the predetermined allowable range, where the reference current values are set at intervals of 1 ms or less; and the precursor is determined to be defective if a current value exceeding the reference current value is detected within a time period corresponding to a time period between starting of voltage application and obtaining of a constant current when a voltage is applied to a normal secondary battery precursor, the time period being within 60 milliseconds from starting of the application of the inspection voltage.

11. The method for manufacturing a secondary battery according to claim 9, wherein the inspection voltage is a constant voltage.

12. The method for manufacturing a secondary battery according to claim 9, wherein the inspection voltage is increased at a constant speed.

13. The method for manufacturing a secondary battery according to claim 9, wherein the inspection voltage is set to be within a range between 20V and 75 V per 1 µm thickness of the separator.

14. The method for manufacturing a secondary battery according to claim 9, wherein the inspection voltage is set to be within a range between 20V and 75 V per 1 µm thickness of the separator.

15. The method for manufacturing a secondary battery according to claim 9, wherein the inspection voltage is set to be within a range between 420 V and 1575V.

16. The method for manufacturing a secondary battery according to claim 9, wherein the separator has a thickness of 25 µm or less.

17. The method for manufacturing a secondary battery according to claim 9, wherein the secondary battery precursor is a precursor of a lithium secondary battery.

18. A method for manufacturing a secondary battery comprising: making a secondary battery precursor including a pair of electrodes and a separator disposed between the pair of electrodes; and inspecting the secondary battery precursor, wherein the step of inspecting the secondary battery precursor comprises:

applying an inspection current between the pair of electrodes before an electrolyte solution is injected between the pair of electrodes, and measuring a voltage due to application of the inspection current at intervals of 1 ms or less; and determining the precursor to be defective if the voltage has a value beyond a predetermined allowable range within 60 milliseconds from starting of the application of the inspection current, the allowable range being calculated based on a voltage waveform when a current is applied to a normal secondary battery precursor.

19. The method for manufacturing a secondary battery according to claim 18, wherein the inspection current is a constant current.

20. The method for manufacturing a secondary battery according to claim 18, wherein the separator has a thickness of 25 µm or less.

21. The method for manufacturing a secondary battery according to claim 18, wherein the secondary battery precursor is a precursor of a lithium secondary battery.

22. A device for inspecting a secondary battery precursor including a pair or electrodes, and a separator disposed between the pair of electrodes, comprising:

voltage application means for applying an inspection voltage between the pair of electrodes;

current measurement means for measuring a current flowing due to application of the inspection voltage at intervals of 1 ms or less;

storage means for storing a reference current value set based on a current when a voltage is applied to a normal secondary battery precursor; and arithmetic operation means for performing a predetermined arithmetic operation using the reference current value stored in the storage means and a value of the current measured by the current measurement means, so as to determine whether the secondary battery precursor is defective or not, wherein the precursor is determined to be defective if the current measured by the current measurement means has a value beyond the reference current value within 60 milliseconds from starting of the application of the inspection voltage.

23. The device for inspecting a secondary battery precursor according to claim 22, wherein the current measurement means is an oscilloscope.

24. A device for inspecting a secondary battery precursor including a pair or electrodes, and a separator disposed between the pair of electrodes, comprising:

current application means for applying an inspection current between the pair of electrodes;

voltage measurement means for measuring a voltage generated due to application of the inspection current at intervals of 1 ms or less;

storage means for storing a reference voltage value set based on a voltage when a current is applied to a normal secondary battery precursor; and arithmetic operation means for performing a predetermined arithmetic operation using the reference voltage value stored in the storage means and a value of the voltage measured by the voltage measurement means, so as to determine whether the secondary battery precursor is defective or not, wherein the precursor is determined to be defective if the voltage measured by the voltage measurement means has a value beyond the reference voltage value within 60 milliseconds from starting of the application of the inspection current.

25. The device for inspecting a secondary battery precursor according to claim 24, wherein the voltage measurement means is an oscilloscope.

* * * * *

UNITED STATES PATENT AND TRADEMARK OFFICE
CERTIFICATE OF CORRECTION

PATENT NO. : 7,239,147 B2 Page 1 of 1
APPLICATION NO. : 10/523177
DATED : July 3, 2007
INVENTOR(S) : Kume et al.

It is certified that error appears in the above-identified patent and that said Letters Patent is hereby corrected as shown below:

Column 14, line 5(claim 1): "pair of electrode ; " should read --pair of electrodes; --.

Signed and Sealed this

Fourth Day of December, 2007

JON W. DUDAS
*Director of the United States Patent and Trademark Office*